(12) United States Patent
Lorenzen et al.

(10) Patent No.: US 7,254,655 B1
(45) Date of Patent: Aug. 7, 2007

(54) SOFTWARE AND PROCESS FOR LOW-LATENCY AUDIO RECORDING

(75) Inventors: Erik Lorenzen, Mesa, AZ (US); Keith Weiner, Queen Creek, AZ (US)

(73) Assignee: DiamondWare, Ltd., Mesa, AZ (US)

( * ) Notice: Subject to any disclaimer, the term of this patent is extended or adjusted under 35 U.S.C. 154(b) by 0 days.

(21) Appl. No.: 11/322,473

(22) Filed: Dec. 30, 2005

Related U.S. Application Data

(63) Continuation of application No. 09/949,172, filed on Sep. 7, 2001, now Pat. No. 7,028,112.

(60) Provisional application No. 60/231,033, filed on Sep. 8, 2000.

(51) Int. Cl.
*G06F 13/10* (2006.01)

(52) U.S. Cl. .............................. 710/55; 710/46; 710/52

(58) Field of Classification Search .................... None
See application file for complete search history.

(56) References Cited

U.S. PATENT DOCUMENTS

| | | | |
|---|---|---|---|
| 4,941,123 A | | 7/1990 | Thompson |
| 5,764,896 A | * | 6/1998 | Johnson ..................... 709/250 |
| 6,640,328 B1 | * | 10/2003 | DiMeo et al. .............. 714/818 |

* cited by examiner

*Primary Examiner*—Ilwoo Park
(74) *Attorney, Agent, or Firm*—Law Office of Karen Dana Oster, LLC

(57) ABSTRACT

A process and software for aggressive capture of digital recording on computers, for the purpose of reducing audio latency, which includes periodic frequent polling of a recording buffer containing audio recording data and a known value, reading out data values that do not match the previously written known value, and writing over the data with the known value.

20 Claims, No Drawings

SOFTWARE AND PROCESS FOR LOW-LATENCY AUDIO RECORDING

The present application is a continuation of U.S. patent application Ser. No. 09/949,172, filed Sep. 7, 2001, now U.S. Pat. No. 7,028,112. U.S. patent application Ser. No. 09/949,172 claims the benefit under 35 USC Section 119(e) of U.S. Provisional Patent Application Ser. No. 60/231,033, filed Sep. 8, 2000. The present application is based on and claims priority from these applications, the disclosures of which are hereby expressly incorporated herein by reference in their entirety.

FIELD OF THE INVENTION

The invention pertains to the field of computer software programs and processes, and more specifically to the field of computer programs and processes for capture of digital recordings on computers.

BACKGROUND OF INVENTION

In conventional architecture for capturing digital recordings on computers, software waits for notification that audio data is available in a buffer. This results in a particular type of latency in audio recordings that is frequently undesirable. A need exists for a process, preferably a software process, to reduce or eliminate this type of latency in audio recordings.

BRIEF SUMMARY OF THE INVENTION

In a preferred embodiment, the invention is a process for aggressive capture of digital recording on computers, for the purpose of reduced audio latency.

In another preferred embodiment, the invention is a software program for aggressive capture of digital recording on computers, for the purpose of reduced audio latency.

BRIEF DESCRIPTION OF THE SEVERAL VIEWS OF THE DRAWINGS

Exhibit 1 is a program illustrative of software programs of the invention that may be used in the process of the invention to provide very low-latency digital audio.

DETAILED DESCRIPTION OF THE INVENTION

In a preferred embodiment, the invention is part of a software component and a process used with the WINDOWS® operating system with the program using the waveIn APIs.

"Latency" is defined as the elapsed time between when an audio event is triggered and when it plays from the speakers. Large play cursor leads contribute to higher latencies.

The invention, both the process and the software embodiments, eliminates a source of latency in audio recording applications, such as telephony. According to the invention, the software polls periodically and frequently, and determines whether the buffer contains new data and if so, how much exactly.

The process of the invention contains the following steps and the software contains instructions to perform the following steps:

(a) poll a recording buffer to which buffer are captured audio recording data and to which buffer a known value has been written;

(b) read out new capture data, that is data values that do not match the known value previously written into the buffer;

(c) write over the data with the known value; and (d) repeats steps (a) to (d).

Preferably, the process of the invention includes before step (a), and the software of the invention includes instructions to perform before step (a), the steps of:

(1) establishing a recording buffer;

(2) requesting that audio recording data be captured to this buffer; and (3) writing a known value into the buffer.

The program establishes a recording buffer. It writes the buffer full of a known value (typically, but not necessarily, 0xce). It then calls the waveIn API to request that the buffer be filled with data captured from a microphone, line-in, or other source.

The program does not wait for the notification message or callback, but periodically scans the buffer for instances of data that do not match the previously written known value. In this way, the program can have some audio data substantially sooner than waveIn would provide the complete buffer of audio data.

The above description is not to be construed as limiting the invention, but is an illustration of the invention. The example is described in reference to the WINDOWS® operating system. However, the invention is applicable to virtually any current or future operating system, including but not limited to Windows 95®, Windows 98®, Windows CE®, Windows Me®, Windows NT®, Windows 2000®, Linux®, MacOS®, BeOS®. The example uses the waveIn API, but could use virtually any current or future audio API including but not limited to DirectSound®, Linux® sound drivers, etc. It is also applicable to use in direct hardware programming, such as with a DMA controller in DOS or other lightweight operating system.

The program as shown in Exhibit 1 is illustrative of software programs of the invention that may be used in the process of the invention to provide very low-latency digital audio.

The invention permits the performance of the following function, which is not to be construed as limiting the invention:

(1) Obtaining the lowest possible recording latency.

The software and process of the invention provide many practical applications. For example, the invention may be used in:

(1) Computer telephony;

(2) Multi-user chat, including games;

(3) Internet radio station broadcast; and (4) Synthesizers and other real-time music applications.

Exhibit 1 is a source code for an exemplary software component as described above, which contains the following software components: RHLP.C, RHLP.H, SND.C, and SND.H. These software components are included on the two CDs that are submitted with this application, and this material on the CDs is incorporated into this specification by reference.

Although the above description, including the Exhibit, contains many specificities, they should not be interpreted as limitations on the scope of the invention, but rather as illustrations. One skilled in the art will understand that many variations of the invention are possible and that these variations are to be included within the scope of the invention as defined in the following claims.

What is claimed is:

1. A method for reducing latency in digital audio recording comprising the steps of:
   (a) polling at a polling address in a sequentially addressed recording buffer to which buffer are captured audio recording data and to which buffer a known value has been written, the polling continuing until a finding of a data value that does not match the known value previously written into the buffer;
   (b) reading out the data value at the polling address that does not match the known value previously written into the buffer;
   (c) writing over the non-matching data with the known value; and
   (d) moving to the next sequential address in the buffer or wrapping to the beginning of the buffer and repeating steps (a) to (c) using the next sequential address as the polling address.

2. The method of claim 1 which further comprises, before step (a), the step of establishing the recording buffer.

3. The method of claim 2 which further comprises, before step (a), the step of requesting that audio recording data be captured to the buffer.

4. The method of claim 3 which further comprises, before step (a), the step of writing a known value into the buffer.

5. The method of claim 2 which further comprises, before step (a), the step of writing a known value into the buffer.

6. The method of claim 1 which further comprises, before step (a), the step of requesting that audio recording data be captured to the buffer.

7. The method of claim 1 which further comprises, before step (a), the step of writing a known value into the buffer.

8. A software program stored in memory for reducing latency in digital audio recording, said software program comprising instructions to a computer to perform the steps of:
   (a) polling at a polling address in a sequentially addressed recording buffer to which buffer are captured audio recording data and to which buffer a known value has been written, the polling continuing until a finding of a data value that does not match the known value previously written into the buffer;
   (b) reading out the data value at the polling address that does not match the known value previously written into the buffer;
   (c) writing over the non-matching data with the known value; and
   (d) moving to the next sequential address in the buffer or wrapping to the beginning of the buffer and repeating steps (a) to (c) using the next sequential address as the polling address.

9. The method of claim 8 which further comprises, before step (a), the step of establishing the recording buffer.

10. The method of claim 9 which further comprises, before step (a), the step of requesting that audio recording data be captured to the buffer.

11. The method of claim 10 which further comprises, before step (a), the step of writing a known value into the buffer.

12. The method of claim 9 which further comprises, before step (a), the step of writing a known value into the buffer.

13. The method of claim 8 which further comprises, before step (a), the step of requesting that audio recording data be captured to the buffer.

14. The method of claim 8 which further comprises, before step (a), the step of writing a known value into the buffer.

15. A system for reducing latency in digital audio recording, said system comprising:
   (a) means for polling at a polling address in a sequentially addressed recording buffer to which buffer are captured audio recording data and to which buffer a known value has been written, the polling continuing until a finding of a data value that does not match the known value previously written into the buffer;
   (b) means for reading out the data value at the polling address that does not match the known value previously written into the buffer;
   (c) means for writing over the non-matching data with the known value; and
   (d) means for moving to the next sequential address in the buffer or wrapping to the beginning of the buffer using the next sequential address as the polling address.

16. The system of claim 15 which further comprises means for establishing the recording buffer.

17. The system of claim 16 which further comprises means for requesting that audio recording data be captured to the buffer.

18. The system of claim 15 which further comprises means for requesting that audio recording data be captured to the buffer.

19. The system of claim 15 which further comprises means for writing a known value into the buffer.

20. A software program stored in memory for reducing latency in digital audio recording, said software program comprising instructions to a computer to perform the steps of:
   (a) polling at a polling address in a sequentially addressed recording buffer to which buffer are captured audio recording data and to which buffer a known value has been written, the polling continuing until a finding of a data value that does not match the known value previously written into the buffer;
   (b) reading out the data value at the polling address that does not match the known value previously written into the buffer to reduce latency; and
   (c) moving to the next sequential address in the buffer or wrapping to the beginning of the buffer and repeating steps (a) and (b) using the next sequential address as the polling address.

* * * * *